United States Patent [19]

Tsurumiya et al.

[11] Patent Number: 4,939,653

[45] Date of Patent: Jul. 3, 1990

[54] METHOD OF AND APPARATUS FOR CONTROLLING STEERING OPERATION OF A MOTOR VEHICLE WITH STEERABLE FRONT AND REAR WHEELS

[75] Inventors: Osamu Tsurumiya; Masaru Abe; Yoshimichi Kawamoto; Takashi Kohata; Ikuo Nonaga; Masataka Izawa, all of Tochigi, Japan

[73] Assignee: Honda Giken Kogyo Kabushiki Kaisha, Tokyo, Japan

[21] Appl. No.: 226,070

[22] Filed: Jul. 29, 1988

[30] Foreign Application Priority Data

Jul. 29, 1987 [JP] Japan ................... 62-189705
Dec. 11, 1987 [JP] Japan ................... 62-314642
Jun. 13, 1988 [JP] Japan ................... 63-145362

[51] Int. Cl.$^5$ ............................. B62D 5/04
[52] U.S. Cl. ..................... 364/424.05; 180/79.1; 180/142; 180/140
[58] Field of Search .......... 364/424.05, 424.01; 180/140, 142, 148, 79.1, 132; 280/47.34; 303/96

[56] References Cited

U.S. PATENT DOCUMENTS

| | | | |
|---|---|---|---|
| 4,598,788 | 7/1986 | Serizawa et al. | 180/140 |
| 4,645,025 | 2/1987 | Ohe et al. | 180/79.1 |
| 4,652,002 | 3/1987 | Kurokawa et al. | 180/79.1 |
| 4,705,131 | 11/1987 | Shibahata et al. | 180/142 |
| 4,706,978 | 11/1987 | Ito | 180/142 |
| 4,719,396 | 1/1988 | Shimizu | 318/432 |
| 4,782,907 | 11/1988 | Morishita et al. | 180/142 |
| 4,819,170 | 4/1989 | Shimizu | 180/142 |

FOREIGN PATENT DOCUMENTS

| | | |
|---|---|---|
| 0165706 | 12/1985 | European Pat. Off. . |
| 0208173 | 1/1987 | European Pat. Off. . |
| 0223256 | 5/1987 | European Pat. Off. . |
| 2147555A | 5/1985 | United Kingdom . |
| 2148220A | 5/1985 | United Kingdom . |
| 2148811A | 6/1985 | United Kingdom . |
| 2153311A | 8/1985 | United Kingdom . |
| 2153762A | 8/1985 | United Kingdom . |
| 2163394A | 2/1986 | United Kingdom . |
| 2188891 | 4/1986 | United Kingdom ............... 180/79.1 |

Primary Examiner—Gary Chin
Attorney, Agent, or Firm—Irving M. Weiner; Joseph P. Carrier; Pamela S. Burt

[57] ABSTRACT

The steering operation of a motor vehicle with steerable front and rear road wheels is controlled by steering the rear road wheels with an actuator such as an electric motor which produces a steering force dependent on a deviation of the actual rear wheel steering angle from a target rear wheel steering angle. The rear road wheels are thus controlled with a characteristic dependent on the coefficient of friction of a road on which the motor vehicle travels and the steering speed at which the motor vehicle is steered. Typically, a steering control method comprises the steps of detecting the steering angle of the front road wheels, determining a target steering angle for the rear wheels based on the steering angle of the front road wheels, detecting the actual steering angle of the rear road wheels, calculating a steering angle deviation of the actual rear wheel steering angle from the target steering angle, determining a rear wheel steering force based on the steering angle deviation, and steering the rear road wheels to the target steering angle with the determined rear wheel steering force.

7 Claims, 13 Drawing Sheets

DATA TABLE 4

DATA TABLE 5

DATA TABLE 6

FIG.19 DATA TABLE 7
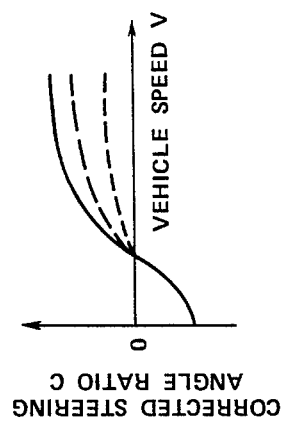
FIG.20 DATA TABLE 8
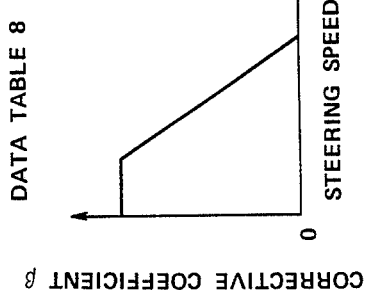
FIG.21
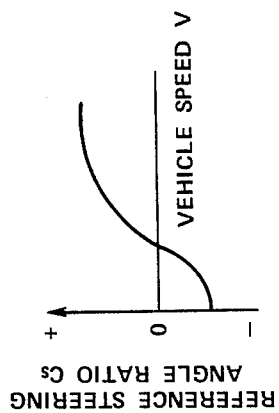
FIG.22 DATA TABLE 9
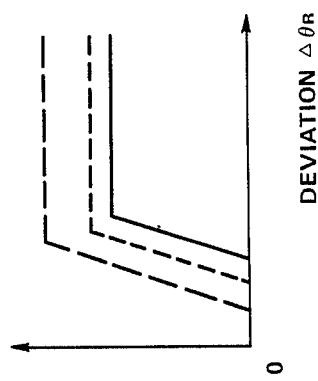
FIG.23 DATA TABLE 10
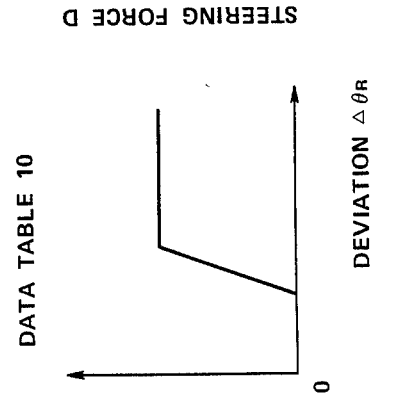
FIG.24
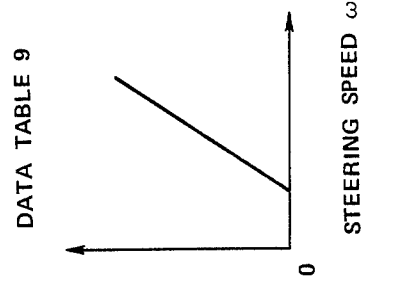

METHOD OF AND APPARATUS FOR CONTROLLING STEERING OPERATION OF A MOTOR VEHICLE WITH STEERABLE FRONT AND REAR WHEELS

BACKGROUND OF THE INVENTION

1. Field of the Invention

The present invention relates to a method of and an apparatus for controlling the steering operation of a motor vehicle having steerable front and rear road wheels, and more particularly to a method of and an apparatus for controlling the steering operation of a motor vehicle in which rear road wheels are steerable by an actuator such as an electric motor in response to the steering action of front road wheels.

2. Description of the Relevant Art

There are known motor vehicles in which both front and rear road wheels are steerable. In some of such motor vehicles, the direction and angle of steering movement of the rear road wheels with respect to the front road wheels are controlled dependent on the speed of travel of the motor vehicle. When steering the motor vehicle in a low vehicle speed range, the rear road wheels are steered in the opposite direction (opposite phase) to the front road wheels for allowing the motor vehicle to make a turn of a small radius. When steering the motor vehicle in a high vehicle speed range, the rear road wheels are steered in the same direction (in phase) as the front wheels for increased motor vehicle stability.

One known motor vehicle with steerable front and rear road wheels is disclosed in Japanese Laid-Open Patent Publication No. 60-67272. According the steering control apparatus disclosed in this publication, rear road wheels are actuated by a step motor the step angle of which is controlled according to the speed of steering action of the motor vehicle. When the steering speed is low, the step angle of the step motor is reduced to turn the rear road wheels in smaller increments for highly accurate steering control. When the steering speed is high, the step angle of the step motor is increased to turn the rear road wheels in greater increments for increased steering response.

The disclosed steering control apparatus, however, does not take into account the turning behavior of the motor vehicle at a high steering speed. The output torque of the step motor is constant, the angle of rotation of the step motor corresponds to the steering angle of the rear road wheels at a predetermined ratio, and the steering angular speed of the rear road wheels is determined solely dependent on the speed of rotation of the step motor.

The steering angle of the rear road wheels is only controlled so as to be simply equalized to a preset target steering angle. Other control factors, such as the coefficient of friction of a road, are not taken into consideration by the disclosed steering control apparatus. More specifically, the motor vehicle does not have turning characteristics in accord with the cornering forces produced on the rear road wheels while the motor vehicle is running at high speed and also with a large road resistance imposed by the road while the motor vehicle is running at low speed.

SUMMARY OF THE INVENTION

It is an object of the present invention to provide a method of and an apparatus for controlling the steering operation of a motor vehicle with steerable front and rear road wheels by controlling the rate of change of the steering angle of the rear road wheels dependent on the coefficient of friction of a road on which the vehicle is running and the speed at which the motor vehicle is steered, for thereby improving the turning capability of the motor vehicle so that the motor vehicle can make turns as intended by the driver of the motor vehicle.

According to the present invention, there is provided a method of controlling the steering operation of a motor vehicle in which rear road wheels are steerable in response to the steering of front road wheels, the method comprising the steps of: detecting a steering action of the front road wheels; determining a target steering angle for the rear road wheels based on the detected steering action of the front road wheels., detecting an actual steering angle of the rear road wheels; calculating a steering angle deviation of the actual steering angle from the target steering angle; determining a rear wheel steering force based on the steering angle deviation; and steering the rear road wheels to the target steering angle with the determined rear wheel steering force.

According to the present invention, there is also provided an apparatus for controlling the steering operation of a motor vehicle in which rear road wheels are steerable in response to the steering of front road wheels, the apparatus comprising: rear wheel target steering angle determining means for determining a target angle for the rear road wheels based on a steering angle of the front road wheels; rear wheel steering angle detecting means for detecting an actual steering angle of the rear road wheels; steering angle deviation calculating means for calculating a steering angle deviation of the actual steering angle of the rear road wheels from the target angle for the rear road wheels; rear wheel steering force determining means for determining a rear wheel steering force based on the steering angle deviation; and driving means for driving the rear road wheels to the target angle with the rear wheel steering force determined by the rear wheel steering force determining means.

The rear road wheels are steered with the steering force dependent on the deviation between the target steering angle therefor and the detected actual steering angle thereof. The rate of change of the actual rear wheel steering angle varies dependent on the steering force and steering reactive force. If the steering reactive force remains constant, then the steering angle deviation is larger as the steering speed is higher and is smaller as the steering angle is smaller. Therefore, the steering speed can be presumed by calculating the steering angle deviation. Thus, by applying the steering force dependent on the steering angle deviation, the motor vehicle can be turned as intended by the driver thereof, and the control system can be simplified. The rate of change of the actual rear wheel steering angle depends upon the resistance to the steering operation, and the resistance to the steering operation depends upon a road reactive force which is governed by the coefficient of friction of the road on which the motor vehicle is traveling. Consequently, the rear wheel steering characteristic is given dependent on the road reactive force, allowing the actuator to respond very quickly to the steering action on a road with a low coefficient of friction, such as a snow-covered road. On such a road, the amount by which the front and rear road wheels are steered in phase with each other under a transient condition is made greater than that on a normal road, so that the stability of the motor vehicle is increased.

According to a preferred embodiment of the present invention, the steering force for the rear road wheels, which is determined dependent on the steering angle deviation of the detected actual steering angle from the target steering angle, is corrected so that it is smaller when the rate of change of the steering angle of the front road wheels is larger. Therefore, when the steering speed is high, the steering angle of the rear road wheels is reduced to allow the motor vehicle to make a quicker and smaller turn. Consequently, at a normal steering speed, the motor vehicle stability is increased, and when the steering speed is high, more yawing is developed on the motor vehicle.

Further according to another embodiment of the present invention, a reference steering angle ratio determined dependent on the vehicle speed is corrected according to the steering speed or steering acceleration, which is indicative of a change in the steering angle, to produce a corrected steering angle coefficient. The target steering angle for the rear road wheels is calculated from the corrected steering angle ratio and the steering angle of the front road wheels, and the rear road wheels are steered to the target steering angle. Thus, when the steering speed is high, indicating that the driver intends to quickly change the direction of travel of the motor vehicle, the rear road wheels are steered in phase with the front road wheels through a small steering angle (at a high vehicle speed). The motor vehicle can therefore change lanes quickly, as intended by the driver.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 19 through 24 are graphs showing data tables employed in the control sequence shown in FIG. 18.

DETAILED DESCRIPTION OF THE PREFERRED EMBODIMENTS

Figure 1:
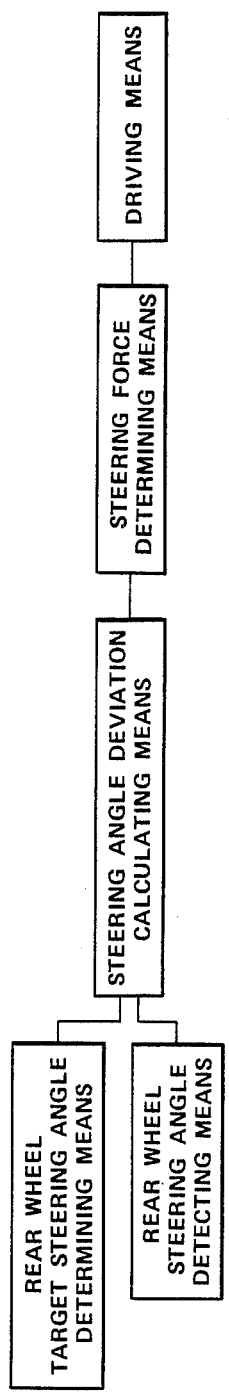
FIG. 1 is a block diagram of a steering control apparatus according to a first embodiment of the present invention.

Like or corresponding parts are denoted by like or corresponding reference characters throughout the views.

A first embodiment of the present invention will be described hereinbelow with reference to FIGS. 1 through 7.

Figure 2:
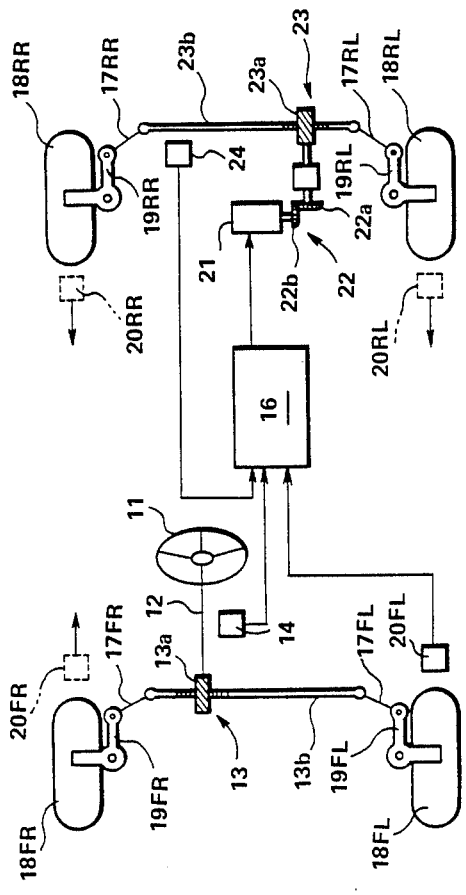
FIG. 2 is a schematic diagram of the steering control apparatus of the first embodiment.

As shown in FIG. 2, a motor vehicle has a steering wheel 11 operatively coupled to a rack-and-pinion front wheel steering gear mechanism 13 through a steering shaft 12. A front wheel steering angle sensor 14 for detecting the angle of rotation of the steering shaft 12 is disposed near the steering shaft 12. The steering angle sensor 14 comprises an encoder or the like for issuing a signal indicative of a steering angle to an electric motor control unit 16.

The front wheel steering mechanism 13 comprises a pinion 13a rotatable with the steering shaft 12, and a rack shaft 13b extending transversely of the motor vehicle and having a rack meshing with the pinion 13a. The rack shaft 13b has opposite ends operatively connected through tie rods 17FL, 17FR to respective knuckle arms 19FL, 19FR on which front road wheels 18FL, 18FR are rotatably supported. Vehicle speed sensors 20FL, 20FR are disposed near the front road wheels 18FL, 18FR for detecting the speeds of rotation thereof and applying signals indicative of the speed of travel of the motor vehicle to the motor control unit 16. The steering angle sensor 14 may be replaced with a sensor for detecting the distance by which the rack shaft 13b is axially moved or a sensor for directly detecting the angle through which the front road wheels 18FL, 18FR are steered.

An electric motor 21 is controlled by the motor control unit 16 and has an output shaft operatively coupled via a bevel gear mechanism 22 to a rack-and-pinion rear wheel steering gear mechanism 23. The bevel gear mechanism 22 comprises a bevel gear 22b fixedly mounted on the output shaft of the motor 21 and a bevel gear 22a rotatable with a pinion 23a of the rear wheel steering gear mechanism 23. The rear wheel steering gear mechanism 23 has the pinion 23a and a rack shaft 23b having a rack meshing with the pinion 23a. The rack shaft 23b has opposite ends operatively coupled through tie rods 17RL, 17RR to respective knuckle arms 19RL, 19RR on which rear road wheels 18RL, 18R are rotatably supported.

The rack shaft 23b is associated with a rear wheel steering angle sensor 24 for detecting the distance by which the rack 23b is axially moved. The rear wheel steering angle sensor 24 comprises a differential transformer or the like for applying a signal indicative of the present steering angle of the rear road wheels 18RL, 18RR to the motor control unit 16.

Figure 3:
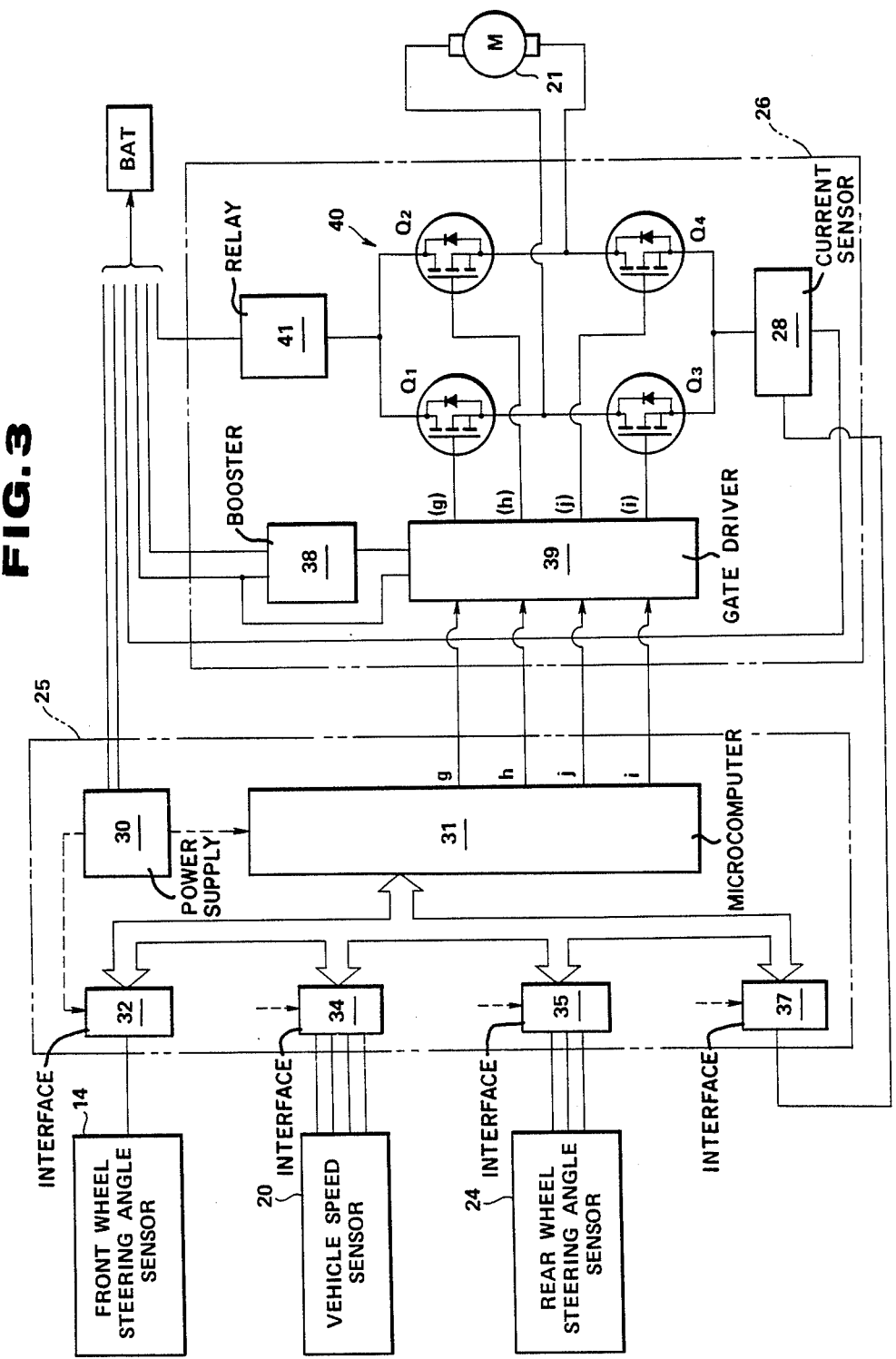
FIG. 3 is a detailed block diagram of the steering control apparatus of the first embodiment.

As illustrated in FIG. 3, the motor control unit 16 comprises a control circuit 25 and a driver circuit 26. The sensors 14, 20FL, 20FR, 24 are electrically connected to the control circuit 25. The driver circuit 26 includes a current sensor 28 which is also electrically connected to the control circuit 25. The driver circuit 26 is electrically connected to the motor 21.

The control circuit 25 includes a constant voltage power supply circuit 30, a microcomputer 31, and input interfaces 32, 34, 35, 37. The constant-voltage power supply circuit 30 is connected to a battery through a fuse (not shown) for supplying constant-voltage electric power to the circuit components of the control circuit 25. The sensors 14, 20FL, 20RL, 24, 28 are connected to the input interfaces 32, 34, 35, 37, which are connected to the microcomputer 32 by a data bus.

The input interface 32 connected to the front wheel steering angle sensor 14 processes an output signal produced thereby to apply a signal representing the steering angle and direction of the front road wheels 18FL, 18FR to the microcomputer 31. The input interface 35 connected to the rear wheel steering sensor 24 comprises an oscillator, a rectifier, and a low-pass filter for applying an AC pulse signal to the primary coil of the differential transformer of the rear wheel steering angle sensor 24 and for shaping a signal from the secondary coil of the differential transformer into a signal which is applied to the microcomputer 31. The input interface 34 coupled to the vehicle speed sensors 20FL, 20FR comprises a waveform shaper and an arithmetic circuit for applying a vehicle speed signal based on output signals from the vehicle speed sensors 20FL, 20FR to the microcomputer 31. The input interface 37 joined to the current sensor 28 has an amplifier and an A/D converter for converting an output signal from the current sensor 28 into a digital signal and applying the digital signal to the microcomputer 31.

The microcomputer 31 comprises a CPU, a ROM, a RAM, and a clock. According to a program stored in the ROM, the microcomputer 31 processes the signals applied from the sensors via the input interfaces 32, 34, 35 to determine the duty factor of a current to be supplied to the motor 21, and applies pulse-width-modulation signals (PWM signals) g, h, i, j indicative of the determined duty factor to the driver circuit 26.

The driver circuit 26 comprises a booster 38, a gate driver 39, the current sensor 28, a relay circuit 41, and a switch circuit 40. The gate driver 39 is connected to the battery, and the switch circuit 40 is connected to the battery through the relay circuit 41. The switch circuit 40 comprises a bridge of four field-effect transistors (FETs) Q1, Q2, Q3, Q4 with their gates joined to the gate driver 39. The FETs Q1, Q2 have their drains connected to the battery and their sources connected to the drains of the FETs Q3, Q4, which have sources connected to ground (i.e., the negative terminal of the battery) through the current sensor 28. The motor 21 is connected between the junction of the source of the FET Q1 and the drain of the FET Q3 and the junction of the source of the FET Q2 and the drain of the FET Q4. The booster 38 increases the voltage of the battery and applies the increased voltage to the gate driver 39. The gate driver 39 applies drive signals to the gates of the FETs Q1, Q2, Q3, Q4 based on the PWM signals g, h, i, j from the microcomputer 31. The current sensor 28 detects a current flowing through the motor 21 and applies a current signal to the input interface 37. In the switch circuit 40, the gate of the FET Q1 is supplied with a drive signal of the duty factor corresponding to the PWM signal g, the gate of the FET Q2 is supplied with a drive signal of the duty factor corresponding to the PWM signal h, the gate of the FET Q3 is supplied with a drive signal of the duty factor corresponding to the PWM signal i, and the gate of the FET Q4 is supplied with a drive signal of the duty factor corresponding to the PWM signal j.

A control sequence of the motor control unit 16 for controlling the motor 21 will be described in detail with reference to FIGS. 4 through 7.

Figure 4:
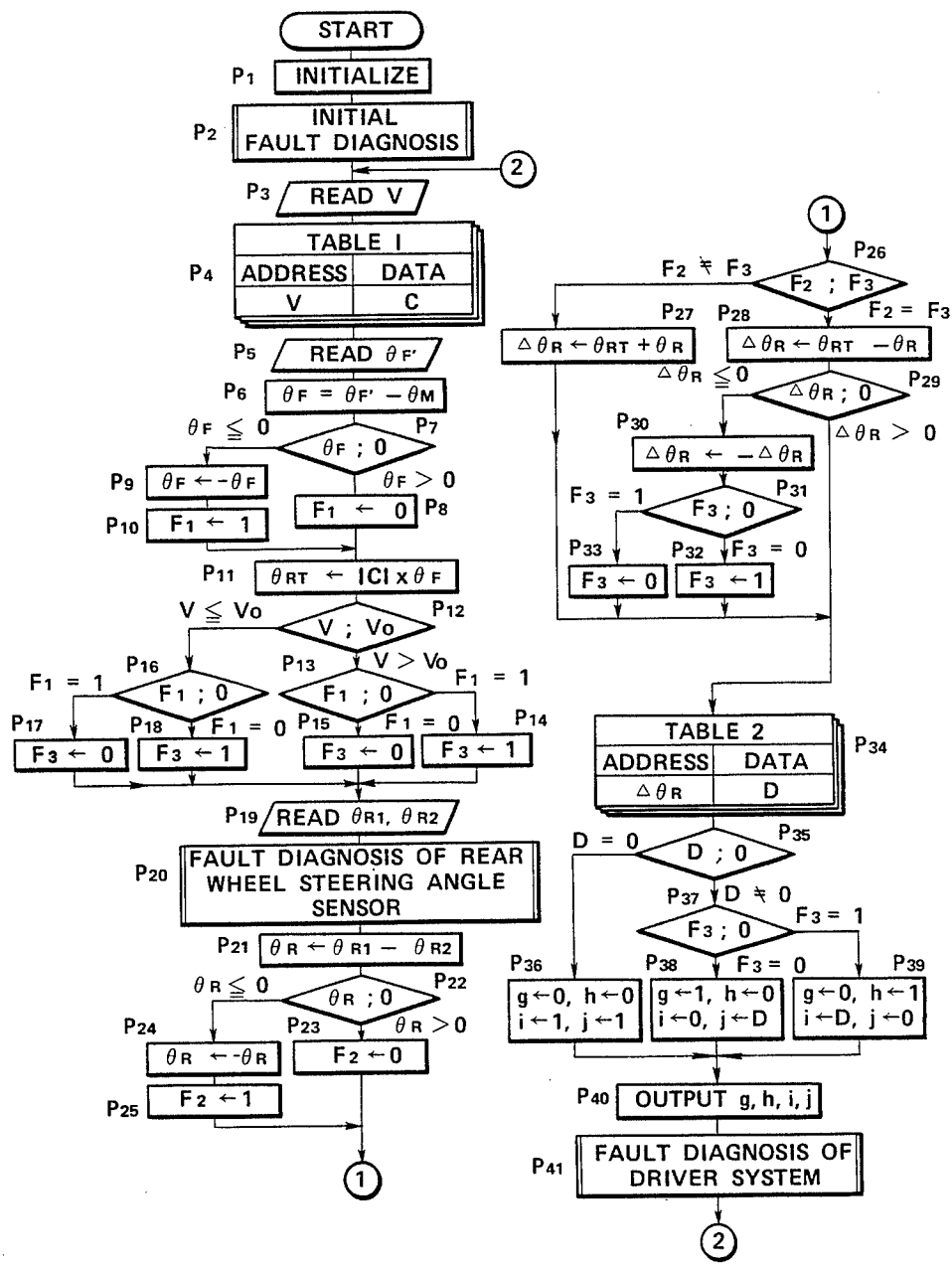
FIG. 4 is a flowchart of a control sequence of the steering control apparatus shown in FIG. 3.

The steering control apparatus for controlling the steering operation of the front and rear road wheels executes the control sequence shown in FIG. 4 to control the motor 21.

When an ignition key (not shown) is operated to turn on a key switch (not shown) of the motor vehicle, the microcomputer 31 and other circuits are energized to start controlling the motor 21. The microcomputer 31 is initialized in a step P1 to erase data stored in an internal register and address the same. Then, a step P2 executes initial fault diagnosis according to a subroutine, and control goes to the following processing only if all components of the control apparatus function properly.

Figure 5:
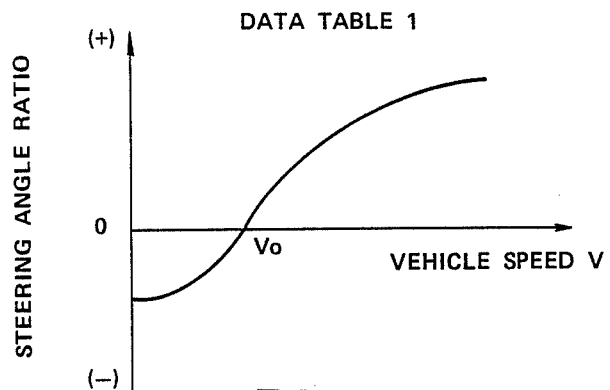
FIGS. 5 and 6 are graphs showing data tables employed in the control sequence shown in FIG. 4.

A vehicle speed V is read in based on the output signals from the vehicle speed sensors 20FL, 20FR in a step P3, which is followed by a step P4 which searches a data table or map 1 shown in FIG. 5 for a steering angle coefficient or ratio C of the rear road wheels with respect to the front road wheels. As shown in FIG. 5, the steering angle coefficient C is negative (i.e., the rear road wheels are steered in the opposite phase to the front road wheels) when the motor vehicle travels in a low vehicle speed range lower than a prescribed vehicle speed V0, and is positive (i.e., the rear road wheels are steered in phase with the front road wheels) when the motor vehicle travels in a high vehicle speed speed range higher than the prescribed vehicle speed V0.

In a step P5, an output signal $\theta F'$ is read from the front wheel steering sensor 14. Then, a neutral reference value $\theta M$ is subtracted from the output signal $\theta F'$ of the front wheel steering sensor 14 to determine a front wheel steering angle $\theta F$ from the neutral steering position in a step P6. Since the front road wheels 18FL, 18FR are mechanically coupled to the steering shaft 12, the angle of rotation of the steering shaft 12 substantially corresponds to the steering angle of the front road wheels 18FL, 18FR. Therefore, the front wheel steering angle $\theta F$ is representative of the steering angle through which the front road wheels 18FL, 18FR are steered.

A next step P7 determines whether the front wheel steering angle $\theta F$ is positive or negative, i.e., the steering direction of the front road wheels. If the front wheel steering angle $\theta F$ is positive, then a flag F1 is set to 0 in a step p8. If the front wheel steering angle $\theta F$ is zero or negative, then the value thereof is made positive (i.e., absolutized) in a step P9, and thereafter the flag F1 is set to 1 in a step P10. Then, the front wheel steering angle $\theta F$ is multiplied by the absolute value of the steering angle coefficient C to obtain a target steering angle $\theta RT$ for the rear road wheels 18RL, 18RR in a step P11.

A step P12 determines whether the vehicle speed V is in excess of the predetermined vehicle speed V0 or not. If the vehicle speed V exceeds the predetermined vehicle speed V0, control executes steps P13, P14, P15. If the vehicle speed V is equal to or smaller than the predetermined vehicle speed V0, then control executes steps P16, P17, P18. The step P13 determines the value of the flag F1. If the flag F1 is 1, then a flag F3 is set to 1 in the step P14, and if the flag F1 is 0, then the flag F3 is set to 0 in the step P15. Likewise, the step P16 determines the value of the flag F1. If the flag F1 is 1, then the flag F3 is set to 0 in the step P17, and if the flag F1 is 0, the flag F3 is set to 1 in the step P18. The flag F3 therefore indicates the direction in which the rear road wheels are to be steered relative to the steering direction of the front road wheels.

In a next step P19, output signals $\theta R1$, $\theta R2$ are read from the rear wheel steering angle sensor 24. A step P20 effects fault diagnosis for the rear wheel steering sensor 24 according to a predetermined subroutine in a manner known in the art. Control goes to subsequent steps only if the rear wheel steering sensor 24 functions properly. In a step P21, the output signals $\theta R1$, $\theta R2$ of the rear wheel steering angle sensor 24 are subtracted one from the other to determine an actual steering angle $\theta R$ of the rear road wheels. Then, a step P22 determines whether the rear wheel steering angle $\theta R$ is positive or negative. If the rear wheel steering angle $\theta R$ is positive, then a flag F2 is set to 0 in a step P23. If the rear wheel steering angle $\theta R$ is equal to zero or negative, then the value of the rear wheel steering angle $\theta R$ is made positive or absolutized in a step P24, and then the flag F2 is set to 1 in a step P25.

A step P26 compares the values of the flags F2, F3. If the values are different from each other, then control goes to a step P27, and if the the values are the same as each other, then control goes to steps P28 through P33.

The step P27 adds the target rear wheel steering angle $\theta RT$ and the rear wheel steering angle $\theta R$ to obtain a deviation $\Delta\theta R$. The step P28 subtracts the rear wheel steering angle $\theta R$ from the target rear wheel steering angle $\theta RT$ to find a deviation $\Delta\theta R$. The step P29 thereafter determines whether the deviation $\Delta\theta R$ is positive or negative. If the deviation $\Delta\theta R$ is zero or negative, the deviation $\Delta\theta R$ is made positive in the step P30, and then the value of the flag F3 is replaced in the steps P31, P32, P33. More specifically, the step P31 determines the value of the flag F3. If the flag F3 is 0, then the flag F3 is replaced with 1 in the step P32, and if the flag F3 is 1, then it is replaced with 0 in the step P33.

Figure 6:
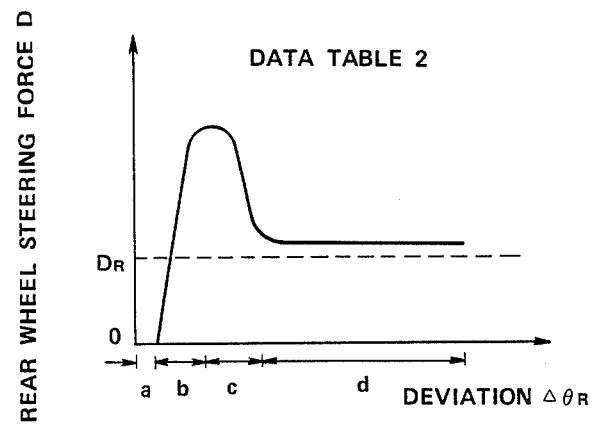

In a step P34, a data table or map 2 shown in FIG. 6 is searched for a rear wheel steering force D using the deviation $\Delta\theta R$ as an address. The rear wheel steering force D represents the duty factor of the current to be passed through the motor 21. In a low deviation range a near zero, the rear wheel steering force D has a dead zone in which the value thereof is zero. As the deviation increases, the rear wheel steering force D increases, then decreases, and becomes constant at a level slightly higher than a steering force DR which is required to steer the rear wheels on a normal road, in a higher deviation range.

A next step P35 determines whether the rear wheel steering force D is 0 or not. If the rear wheel steering force D is 0, then the PWM signals g, h, i, j are set to 0, 0, 1, 1, respectively, in a step P36. If the rear wheel steering force D is not 0, then a step P37 ascertains the value of the flag F3. If the flag F3 is 0, then the PWM signals g, h, i, j are set to 1, 0, 0, D, respectively, in a step P38. If the flag F3 is 1, then the PWM signals g, h, i, j are set to 0, 1, D, 0, respectively, in a step P39. Thereafter, the PWM signals g, h, i, j are issued in a step P40. Therefore, the motor 21 is energized with a duty factor D dependent on the steering direction of the rear road wheels 18RL, 18RR. When the motor 21 is not energized, the winding thereof is short-circuited for electrically braking the motor 21 to keep the rear wheel steering angle at the target steering angle. Subsequently, the driver system including the motor 21 and the switch circuit 40 is diagnosed for fault according to a subroutine in a step P41. Then, the control sequence from the step P2 is repeated.

In the steering control apparatus of the first embodiment, therefore, the motor 21 is supplied with an electric current dependent on the deviation $\Delta\theta R$ between the actual steering angle $\theta R$ of the rear road wheels 18RL, 18RR and the target steering angle $\theta R$ which is determined according to the vehicle speed, and the rear road wheels 18RL, 18RR are steered by the motor 21 in order to reduce the deviation.

Under normal steering conditions, the deviation $\Delta\theta R$ is in a range b (FIG. 6). If the deviation $\Delta\theta R$ is larger in the range b, the rear road wheels are steered with a relatively large steering force, and if the deviation $\Delta\theta R$ is smaller in the range b, the rear road wheels are steered with a relatively small force, for quickly steering the rear road wheels up to the target steering angle. The dead zone a is effective to prevent the motor 21 from hunting. When the steering speed is high, the deviation $\Delta\theta R$ is in a range c or d where the drive power of the motor is lowered to slowly steer the rear road wheels. While making a high-speed turn in which the rear road wheels 18RL, 18RR are steered in phase with the front road wheels 18FL, 18FR, the rear wheel steering angle can quickly be brought into accord with the target steering angle without hunting under normal steering conditions, so that a high steering response can be obtained. When the steering speed is high, understeer that is equivalent to the condition in which the steering force is reduced and the steering angle coefficient C is reduced transiently, is suppressed for quick turning action of the motor vehicle. The rear road wheels 18RL, 18RR are affected by the steering force and steering reactive force on which the rate of change of the actual steering angle $\theta R$ acts. Where the steering reactive force is small, the rate of change of the actual steering angle $\theta R$ is large. The motor 21 is thus made more responsive to the steering action on a road with a low coefficient of friction than on a normal road, resulting in the same effect as an increased steering angle coefficient C, so that the motor vehicle can be stabilized on a road with a low coefficient of friction such as a snow-covered road.

Figure 7:
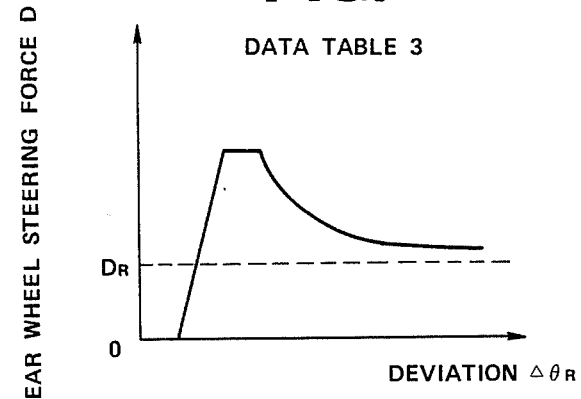
FIG. 7 is a graph showing another data table that can be employed in the control sequence shown in FIG. 4.
Figure 8:
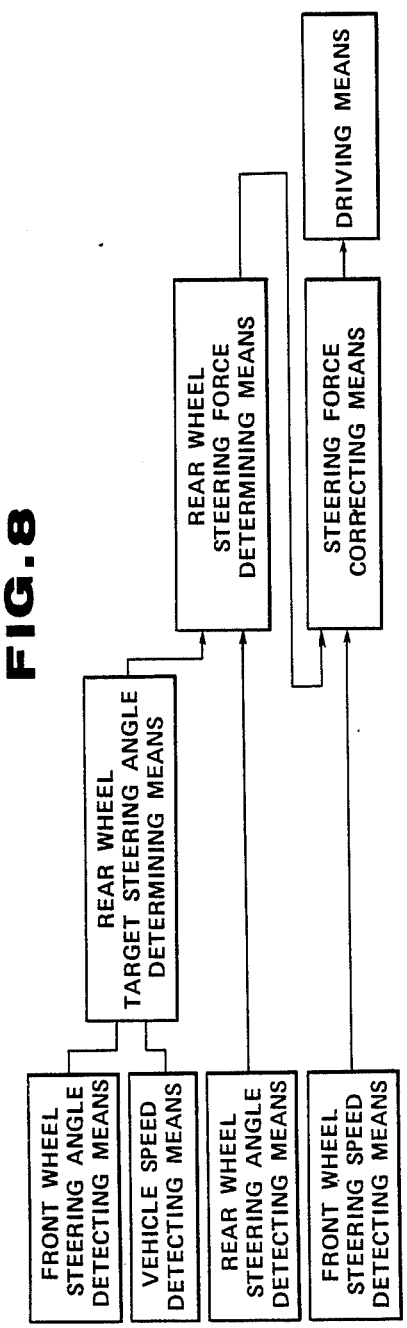
FIG. 8 is a block diagram of a steering control apparatus according to a second embodiment of the present invention.

In the step P34 in FIG. 4, the rear wheel steering force D may be determined from a data table 3 shown in FIG. 7 based on the deviation $\Delta\theta R$.

A second embodiment of the present invention will be described with reference to FIGS. 8 through 15.

Figure 9:
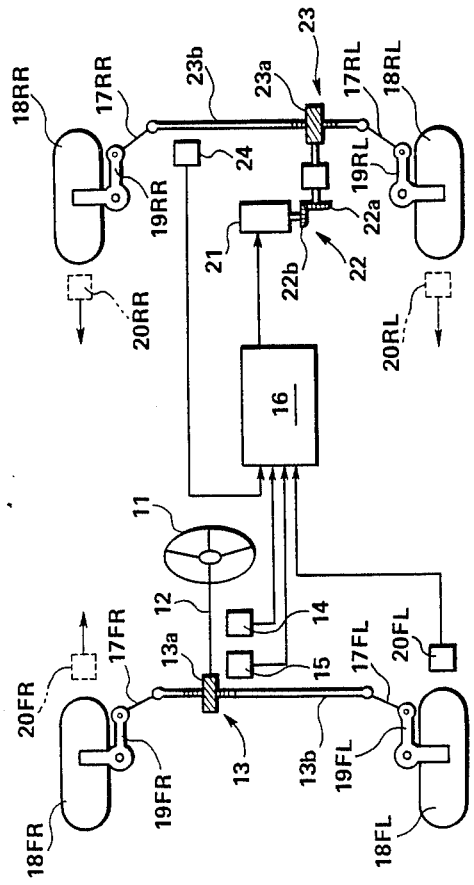
FIG. 9 is a schematic diagram of the steering control apparatus of the second embodiment.

As shown in FIG. 9, a steering speed sensor 15 is additionally disposed near the steering shaft 12 for detecting the angular speed (steering speed) of rotation of the steering shaft 12. The steering speed sensor 15 comprises an electric generator coupled to the steering shaft 12 for applying a signal indicative of the steering speed (corresponding to the rate of change of the front wheel steering angle) to the motor control unit 16. The steering speed sensor 15 may be replaced with a differentiating circuit for differentiating the detected signal from the steering angle sensor 14.

Figure 10:
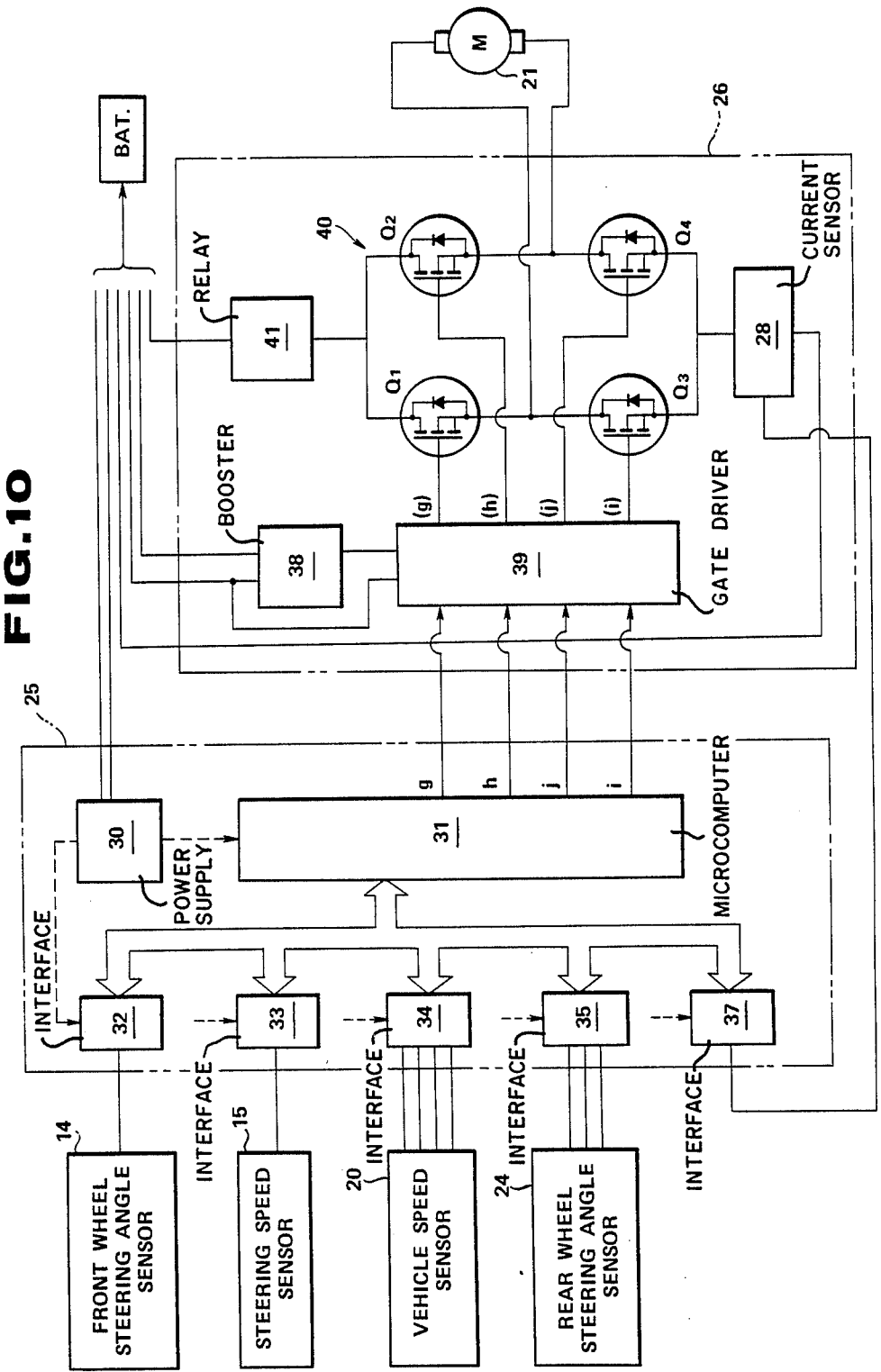
FIG. 10 is a detailed block diagram of the steering control apparatus of the second embodiment.

As shown in FIG. 10, the steering speed sensor 15 is electrically connected to an input interface 33 in the control circuit 25. The input interface 33 processes an output signal from the steering speed sensor 15 to apply a digital signal representing the steering speed to the microcomputer 31.

A control sequence of the motor control unit 16 for controlling the motor 21 according to the second embodiment will be described with reference to FIGS. 11 through 13.

Figure 11:
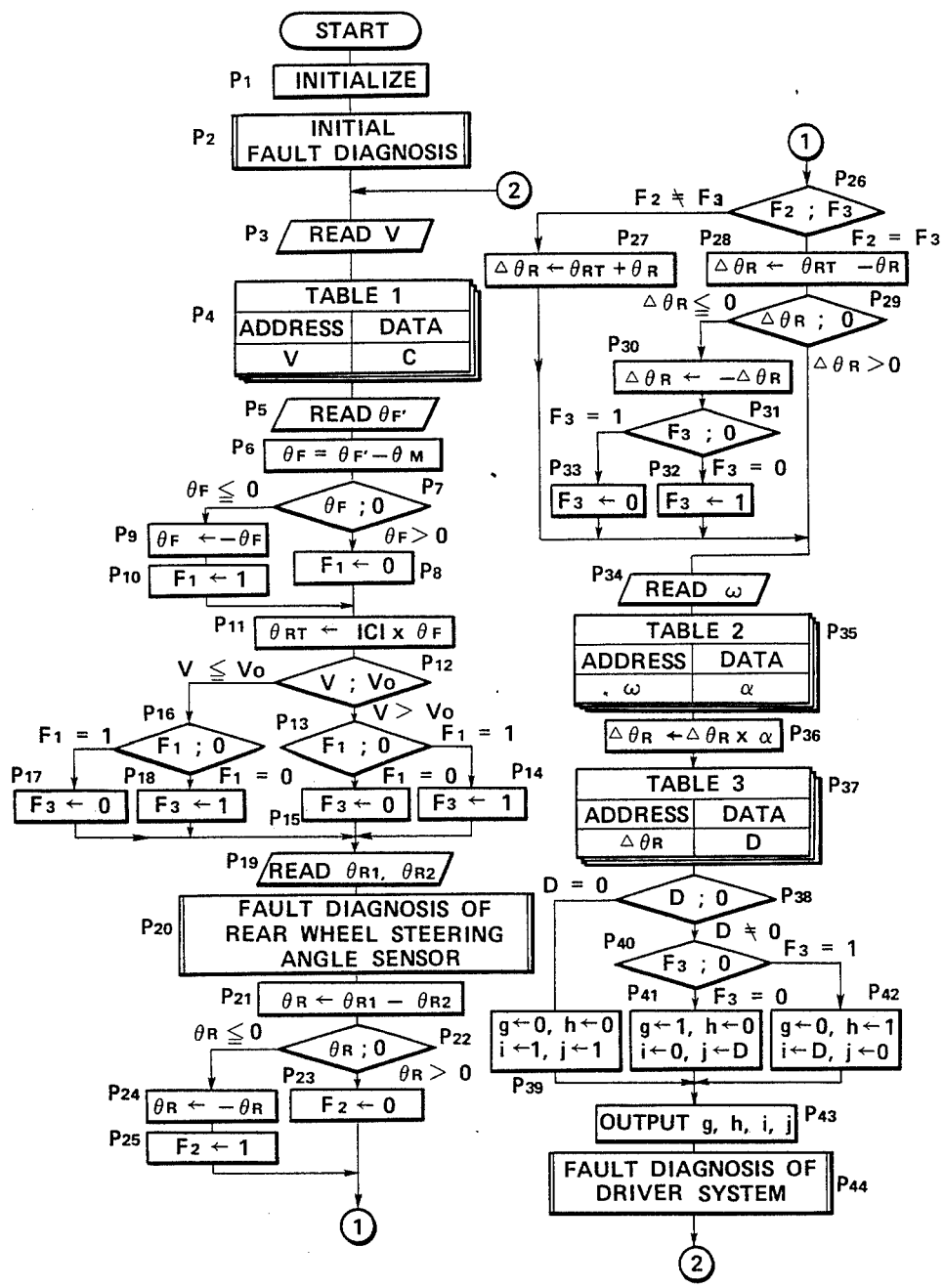
FIG. 11 is a flowchart of a control sequence of the steering control apparatus shown in FIG. 10.
Figure 12:
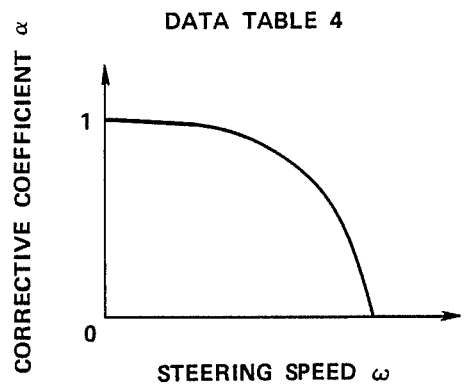
FIGS. 12 and 13 are graphs showing data tables employed in the control sequence shown in FIG. 11.

As shown in FIG. 11, steps P1 through P33 are the same as those of the flowchart shown in FIG. 4. A step P34 reads in a steering speed $\omega$ from the detected output signal from the steering speed sensor 15. In a step P35, a data table or map 4 shown in FIG. 12 is searched for a corrective coefficient $\alpha$ using the steering speed $\omega$ as an address. In a step P36, the deviation $\Delta\theta R$ is corrected by being multiplied by the corrective coefficient $\alpha$. As is apparent from FIG. 12, the corrective coefficient $\alpha$ is about 1 when the steering speed $\omega$ is low, and becomes progressively smaller until it is reduced to zero when the steering speed $\omega$ goes higher. Therefore, the deviation $\Delta\theta R$ corrected by the corrective coefficient $\alpha$ is smaller when the steering speed $\omega$ is higher.

Figure 13:
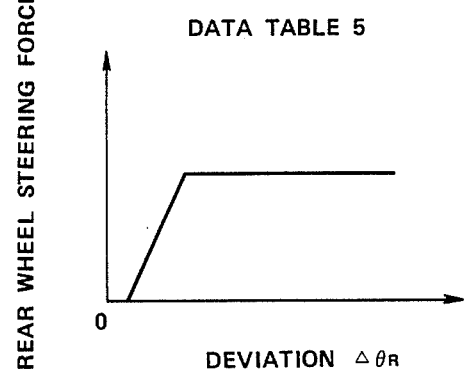

In a next step P37, a data table or map 5 shown in FIG. 13 is searched for a rear wheel steering force D using the deviation $\Delta\theta R$ as an address. The rear wheel steering force D represents the duty factor of the current flowing through the motor 21, i.e., the value of the current. The rear wheel steering force has a dead zone in which it is zero where the deviation is close to zero. As the deviation increases, the rear wheel steering force D increases, and becomes constant in a high deviation range.

In the step P37, since the deviation $\Delta\theta R$ corrected based on the steering speed $\omega$ is smaller than the deviation calculated in the steps P27, P28 in a range in which the steering speed $\omega$ is higher, the steering force D is smaller in the range in which the steering speed $\omega$ is higher, than in the range in which the steering speed $\omega$ is lower.

Therefore, when the steering speed is high, the steering angle of the rear road wheels is reduced to allow the motor vehicle to make a quicker and smaller turn. Consequently, at a normal steering speed, the motor vehicle stability is increased, and when the steering speed is high, more yawing is developed on the motor vehicle.

Where the coefficient of friction of the road on which the motor vehicle is running is low, and where the deviation $\Delta\theta R$ between the rear wheel steering angle $\theta R$ and the target steering angle $\Delta\theta T$ is relatively large, the steering force D for the rear road wheels is reduced. Thus, the steering speed of the rear wheels is given a characteristic dependent on the coefficient of friction of the road.

Figure 14:
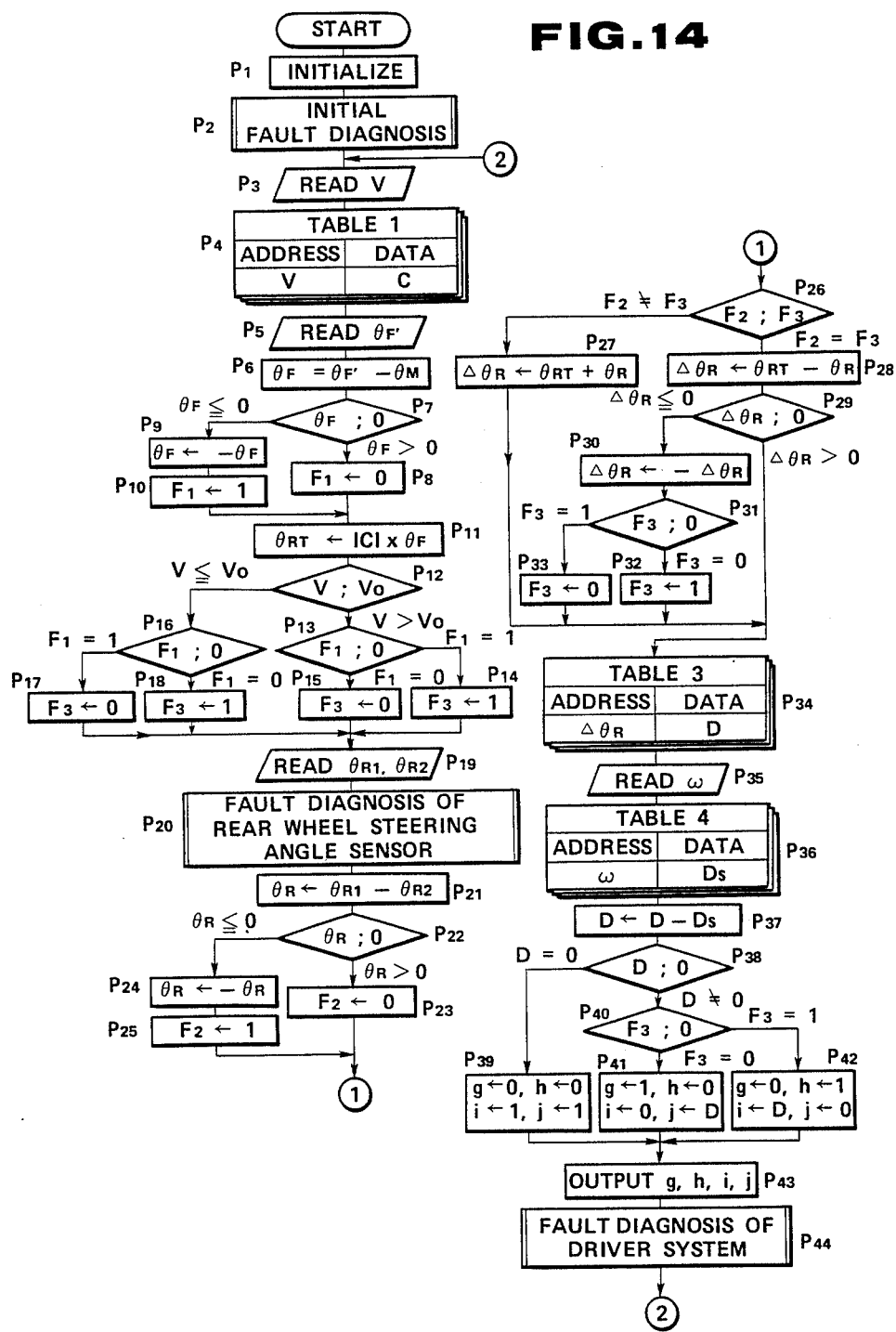
FIG. 14 is a flowchart of a control sequence of a steering control apparatus according to a third embodiment of the present invention.

FIG. 14 shows a control sequence for a steering control apparatus for a motor vehicle with steerable front and rear wheels according to a third embodiment of the present invention. The steps P1 through P33, P34, P35, P38 through P44 correspond respectively to the steps P1 through P33, P37, P34, P38 through P44 shown in FIG. 11, and will not be described.

Figure 15:
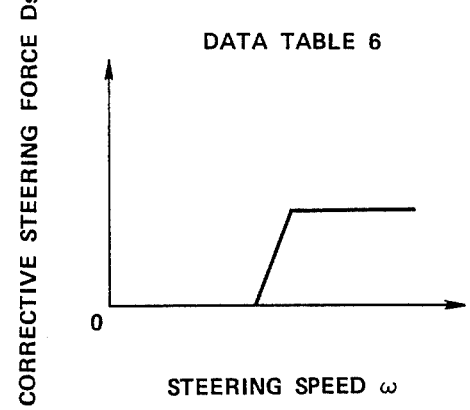
FIG. 15 is a graph illustrating a data table employed in the control sequence of FIG. 14.
Figure 16:
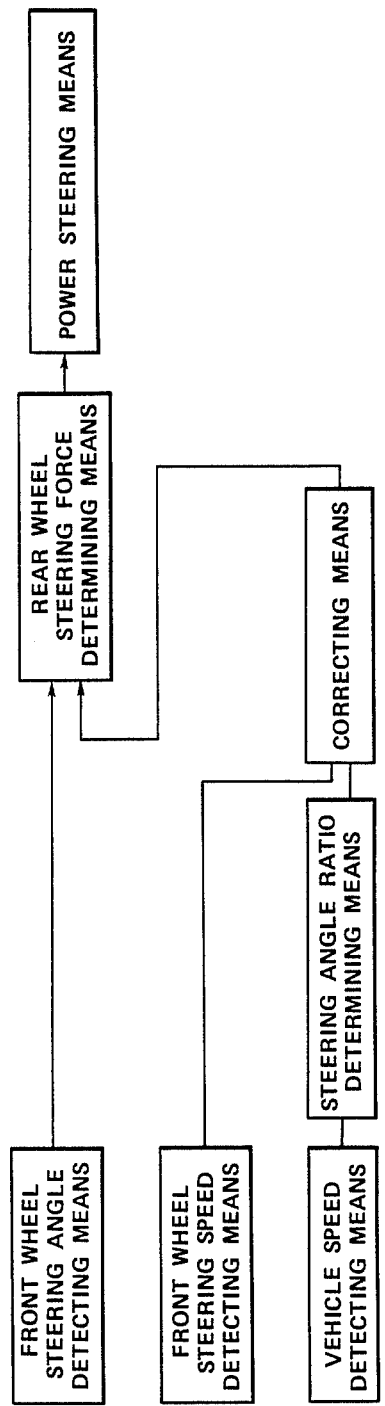
FIG. 16 is a block diagram of a steering control apparatus according to a fourth embodiment of the present invention.

In a step P36, a data table or map 6 shown in FIG. 15 is searched for a corrective steering force Ds using the steering speed $\omega$ as an address. In a next step P37, the steering force D is corrected by subtracting the corrective steering force Ds from the steering force D. As is apparent from FIG. 15, the corrective steering force Ds progressively increases up to a prescribed value when the steering speed $\omega$ is higher. Therefore, the steering force D from which the corrective steering force Ds is subtracted is smaller in the range in which the steering speed $\omega$ is higher. Consequently, the rear wheel steering force is given a characteristic dependent on the steering speed.

FIGS. 16 through 23 illustrate a fourth embodiment of the present invention.

In the fourth embodiment, the steering angle sensor 14 and the steering speed sensor 15 as with the second embodiment are also employed.

Figure 17:
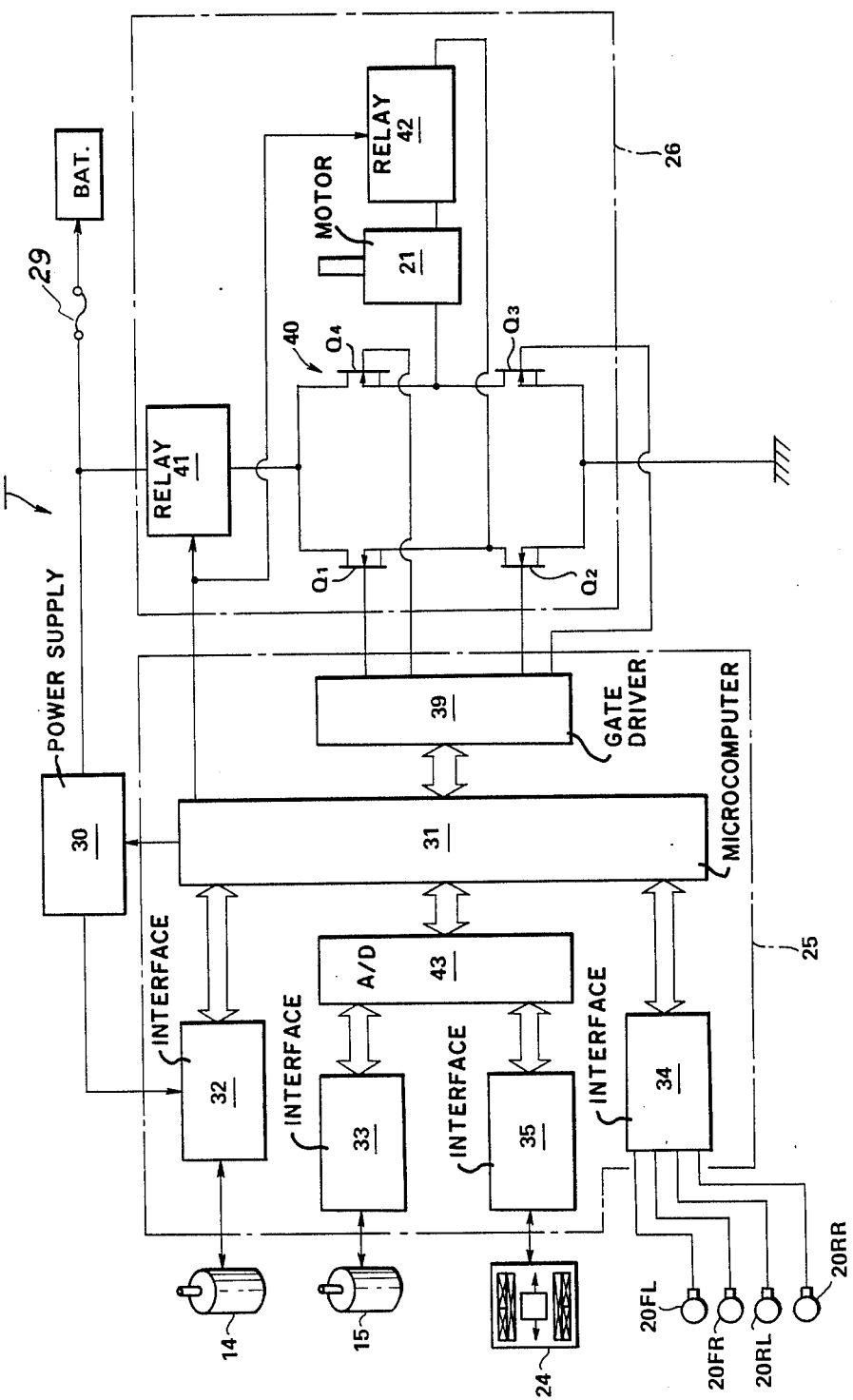
FIG. 17 is a detailed block diagram of the steering control apparatus of the fourth embodiment.
Figure 18:
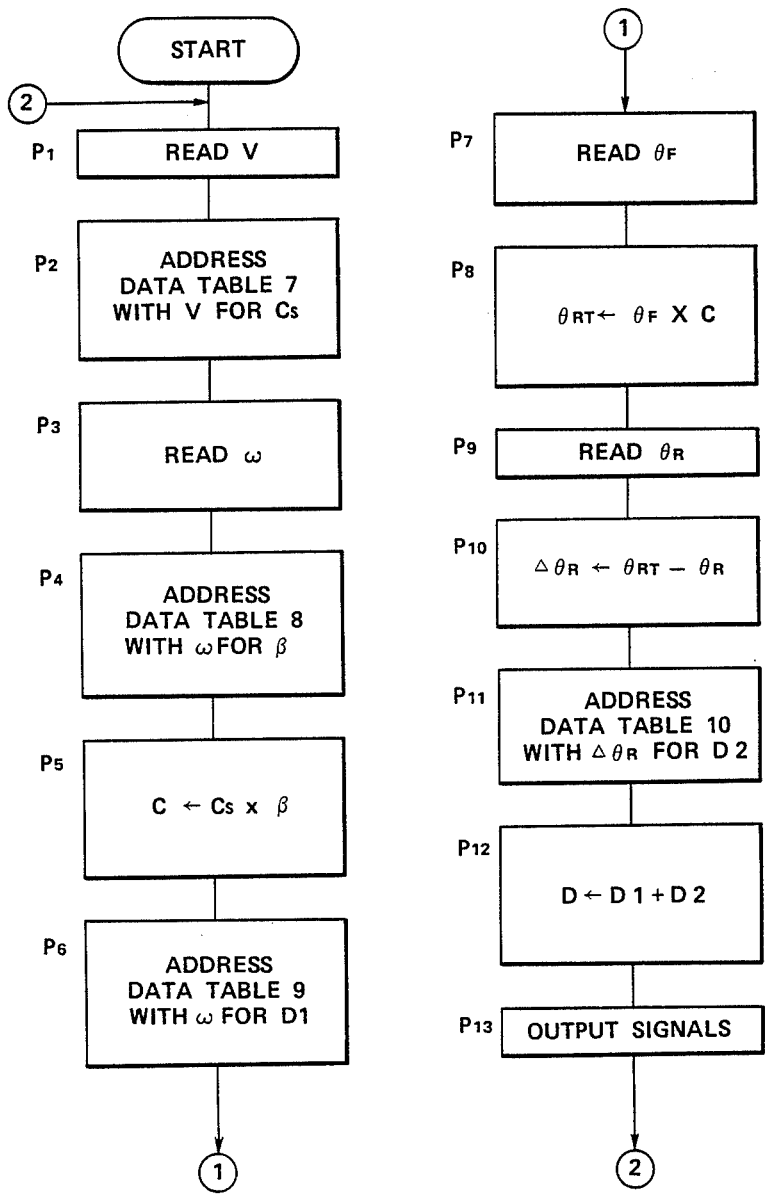
FIG. 18 is a flowchart of a control sequence of the steering control apparatus shown in FIG. 17.

In FIG. 17, a constant-voltage power supply circuit 30 is connected to the battery through a fuse 29 for supplying a constant voltage to a control circuit 25.

The control circuit 25 comprises a microcomputer 31, an interface 32 connected to the steering angle sensor 14, an interface 33 connected to the steering speed sensor 15, an interface 35 connected to the rear wheel steering angle sensor 24, an interface 34 connected to vehicle speed sensors 20FL, 20FR, 20RL, 20RR associated with the front and rear road wheels, an A/D converter 43, and a driver 39.

The microcomputer 31 is supplied with a detected signal from the steering angle sensor 14 and detected signals from the vehicle speed sensors 20FL, 20FR, 20RL, 20RR through the interfaces 32, 34. Detected signals from the steering speed sensor 15 and the rear steering angle sensor 24 via the interfaces 33, 35 are converted by the A/D converter 43 into digital signals which are applied to the microcomputer 31.

The driver 39 is connected to the gates of four field-effect transistors (FETs) Q1, Q2, Q3, Q4 of a switch circuit 40 of a driver circuit 26. The driver 39 applies pulse-width-modulation signals (PWM signals) of duty factors dependent on an applied control signal to the gates of the FETs Q1, Q2, Q3, Q4.

The driver circuit 26 has relay circuits 41, 42 having solenoids coupled to the microcomputer 31 and contacts actuatable by the solenoids. The contacts are, therefore, opened and closed in dependence on the output signal from the microcomputer 31 for selectively making and breaking the driver circuit 26.

A control sequence for controlling the motor 21 with the motor control unit 16 will be described with reference to FIGS. 18 through 24.

A vehicle speed V is read in based on the detected signal from the vehicle speed sensors 20FL, 20FR, 20RL, 20RR in a step P1, and then a data table or map 7 shown in FIG. 19 is searched for a reference steering angle ratio Cs using the vehicle speed V as an address in a step P2. The reference steering angle ratio Cs represents the ratio ($\theta R/\theta F$) of a rear wheel steering angle $\theta R$ to a front wheel steering angle $\theta F$ and is determined in substantially the same manner as shown in FIG. 5 of the first embodiment.

In a step P3, a steering speed $\omega$ is read in based on the detected signal from the steering speed sensor 15. A data table or map 8 shown in FIG. 20 is searched for a corrective coefficient $\beta$ using the steering speed $\omega$ as an address in a step P4. Then, the reference steering angle ratio Cs is multiplied by the corrective coefficient $\beta$ so as to be corrected only in a positive-value range thereby to determine a corrected steering angle ratio C. The corrected steering angle ratio C is indicated by the solid-line curve in FIG. 21 in a low steering speed range in which the corrective coefficient $\beta$ is 1. In a steering speed range in which the corrective coefficient $\beta$ is smaller than 1, the corrected steering angle ratio C is indicated by broken-line curves in a higher vehicle speed range. Therefore, while output signals are being applied to the switch circuit 40, if the driver turns the steering wheel 11 at a high speed, the steering angle ratio between the front and rear road wheels is smaller in a higher vehicle speed range, and the steering angle $\theta R$ of the rear road wheels 18RL, 18RR is smaller dependent on the steering speed. Understeer of the motor vehicle is thus suppressed for a quick lane change.

In a step P6, a data table or map 9 shown in FIG. 22 is searched for a steering speed component D1 of the steering force using the steering speed $\omega$ as an address. The steering speed component D1 and a steering angle component D2 (described later) represent the duty factor of an electric current which is to flow through the motor 21, and correspond to the torque which is produced as the steering force by the motor 21. In a next step p7, the steering angle of the steering wheel 11, i.e., the steering angle $\theta F$ of the front road wheels 18FL, 18FR is read in based on the detected signal from the steering angle sensor 14. The steering angle $\theta F$ of the front road wheels 18FL, 18FR is multiplied by the corrected steering angle ratio C to obtain a target steering angle ORT for the rear road wheels 18RL, 18RR in a step P8.

The actual steering angle $\theta R$ of the rear wheels 18RL, 18RR is read in based on the detected signal from the rear wheel steering sensor 24 in a step P9. Then, the actual steering angle $\theta R$ is subtracted from the target steering angle ORT for the rear road wheels 18RL, 18Rr to produce a deviation $\Delta\theta R$ in a step P10. In a next step P11, a data table or map 10 shown in FIG. 23 is searched for a steering angle component D2 of the steering force using the deviation $\Delta\theta R$ as an address. In a step P12, the steering speed component D1 and the steering angle component D2 are added to each other to determine a steering force D which indicates the duty factor of the current to be supplied to the motor 21.

As shown in FIG. 24, the steering force D has a dead zone in which the steering force D is zero in a lower deviation range. The steering force D is variable such that its dead zone is reduced when the steering force is greater. Therefore, while output signals are being applied to the switch circuit 40, if the steering speed is higher as when the steering wheel 11 starts being turned, the dead zone is reduced for increased response, and if the steering speed is lower, the dead zone is increased for the prevention of hunting.

In a step P13, a signal representing the duty factor D is applied to the driver 39 which in turn applies PWM signals to the gates of the FETs Q1, Q2, Q3, Q4 of the switch circuit 40. Therefore, the motor 21 is energized with the duty factor D and dependent on the steering direction of the rear road wheels 18RL, 18RR (their phase relationship to the front road wheels 18FL, 18FR) for steering the rear road wheels 18RL, 18RR with the steering force dependent on the duty factor D.

With the steering control apparatus of the invention, as described above, the steering angle ratio between the front and rear road wheels is controlled dependent on the steering speed representing the intention of the driver in order that the direction of travel of the motor vehicle is quickly varied when the steering speed is large. Therefore, the maneuverability of the motor vehicle is improved. Moreover, when the steering speed is large, the rear road wheels are steered with a large steering force, so that the steering control response is increased. Since the dead zone of the steering force is smaller when the steering speed is higher and is larger when the steering speed is lower, the steering control response is improved without hunting.

While a change in the steering angle is detected according to the steering speed in the above embodiments, it may be detected according to steering acceleration. In addition, while the rear road wheels are steered by the motor in each of the aforesaid embodiments, the rear road wheels may be steered by an actuator such as a hydraulic cylinder rather than the motor.

With the present invention, as described above, inasmuch as the rear road wheels are steered by the steering force dependent on the deviation of the actual steering angle from the target steering angle, the rear wheel steering action is given a characteristic dependent on the steering speed and the coefficient of friction of the road on which the motor vehicle is running. Consequently, the motor vehicle has a good turning capability irrespective of the coefficient of friction of the road, and can be steered in close accordance with the intention of the driver.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A method of controlling the steering operation of a motor vehicle in which rear road wheels are steerable in response to the steering of front road wheels, said method comprising the steps of:
   detecting a steering angle of the front road wheels;
   determining a target steering angle for the rear road wheels based on the detected steering angle of the front road wheels;
   detecting an actual steering angle of the rear road wheels;
   calculating a steering angle deviation of said actual steering angle from said target steering angle;
   determining a rear wheel steering force based on said steering angle deviation so that the rear wheel steering force is zero in a range in which said steering angle deviation is close to zero, increases with said steering angle deviation and is reduced in a range in which said steering angle deviation is larger than a predetermined value; and
   steering the rear road wheels to said target steering angle with said determined rear wheel steering force.

2. A method of controlling the steering operation of a motor vehicle in which rear road wheels are steerable in response to the steering of front road wheels, said method comprising the steps of:
   detecting a steering angle of the front road wheels;
   determining a target steering angle for the rear road wheels based on the detected steering angle of the front road wheels;
   detecting an actual steering angle of the rear road wheels;
   calculating a steering angle deviation of said actual steering angle from said target steering angle;

determining a rear wheel steering force based on said steering angle deviation;

detecting a rate of change of the steering angle of the front road wheels;

correcting said determined rear wheel steering force so as to be smaller when said detected rate of change is larger than a predetermined value; and steering said rear road wheels with the corrected rear wheel steering force to said target steering angle.

3. A method of controlling the steering operation of a motor vehicle in which rear road wheels are steerable in response to the steering of front road wheels, said method comprising the steps of:

detecting a steering angle of the front road wheels;

detecting the rate of change of said steering angle of the front road wheels;

detecting an actual steering angle of the rear road wheels;

detecting a vehicle speed of the motor vehicle;

determining a reference steering angle ratio between the front and rear road wheels dependent on said vehicle speed;

determining a corrected steering angle ratio by correcting said reference steering angle ratio dependent on a detected rate of change in the steering angle of the front road wheels;

calculating a target steering angle for the rear road wheels based on said corrected steering angle ratio and said steering angle of the front road wheels;

calculating a steering angle deviation of said actual steering angle of the rear road wheels from said target steering angle;

determining a rear wheel steering force based on said steering angle deviation; and steering the rear road wheels to said target steering angle with said determined rear wheel steering force.

4. An apparatus for controlling the steering operation of a motor vehicle in which rear road wheels are steerable in response to the steering of front road wheels, said apparatus comprising:

rear wheel target steering angle determining means for determining a target angle for the rear road wheels based on a steering angle of the front road wheels;

rear wheel steering angle detecting means for detecting an actual steering angle of the rear road wheels;

steering angle deviation calculating means for calculating a steering angle deviation of said actual steering angle of the rear road wheels from the target angle for the rear road wheels;

rear wheel steering force determining means for determining a rear wheel steering force based on said steering angle deviation;

front wheel steering speed detecting means for detecting the rate of change of the steering angle of the front road wheels;

steering force correcting means for correcting the rear wheel steering force which is determined by said rear wheel steering force determining means dependent on said detected rate of change of the steering angle of the front road wheels so that the rear wheel steering force is smaller when said rate of change is larger than a predetermined value; and driving means including means for steering the rear road wheels to said target steering angle with said corrected rear wheel steering force.

5. An apparatus for controlling the steering operation of a motor vehicle in which rear road wheels are steerable in response to the steering of front road wheels, said apparatus comprising:

front wheel steering angle detecting means for detecting a steering angle of the front road wheels;

steering angle rate of change detecting means for detecting a rate of change in the steering angle of the front road wheels;

rear wheel steering angle detecting means for detecting an actual steering angle of the rear road wheels;

vehicle speed detecting means for detecting the speed of travel of the motor vehicle;

steering angle ratio determining means for determining a reference steering angle ratio between the front and rear road wheels dependent on the vehicle speed detected by said vehicle speed detecting means;

correcting means for correcting the reference steering angle ratio determined by said steering angle ratio determining means dependent on the rate of change in the steering angle detected by said steering angle change detecting means to determine a corrected steering angle ratio;

rear wheel target steering angle calculating means for calculating a target angle for the rear road wheels based on the corrected steering angle ratio determined by said correcting means and the steering angle of the front road wheels detected by said front wheel steering angle detecting means;

steering angle deviation calculating means for calculating a steering angle deviation of said actual steering angle of the rear road wheels from said target angle for the rear road wheels;

rear wheel steering force determining means for determining a rear wheel steering force based on said steering angle deviation and the rate of change in the steering angle of the front road wheels; and steering means for driving the rear road wheels to said target angle with the rear wheel steering force determined by said rear wheel steering force determining means.

6. A method of controlling the steering operation of a motor vehicle in which rear road wheels are steerable in response to the steering of front road wheels, said method comprising the steps of:

detecting a steering angle of the front road wheels;

determining a target steering angle for the rear road wheels based on the detected steering angle of the front road wheels;

detecting an actual steering angle of the rear road wheels;

calculating a steering angle deviation of said actual steering angle from said target steering angle;

detecting a rate of change of the steering angle of the front road wheels;

correcting said steering angle deviation so as to be smaller when the detected rate of change is larger than a predetermined value;

determining a rear wheel steering force based on said corrected steering angle deviation; and steering the rear road wheels to said target steering angle with said determined rear wheel steering force.

7. An apparatus for controlling the steering operation of a motor vehicle in which rear road wheels are steerable in response to the steering of front road wheels, said steering apparatus comprising:

means for detecting a steering angle of the front road wheels:

rear wheel target steering angle determining means for determining a target angle for the rear road wheels based on said detected steering angle of the front road wheels;

rear wheel steering angle detecting means for detecting an actual steering angle of the rear road wheels;

steering angle deviation calculating means for calculating a steering angle deviation of said actual steering angle of the rear road wheels from said target angle for the rear road wheels;

front wheel steering speed detecting means for detecting the rate of change of the steering angle of the front road wheels;

means for correcting the steering angle deviation calculated by said calculating means dependent on said detected rate of change of the steering angle of the front road wheels so that the steering angle deviation is smaller when said rate of change is larger than a predetermined value;

rear wheel steering force determining means for determining a rear wheel steering force based on said corrected steering angle deviation; and means for driving the rear road wheels to said target angle with the rear steering force determined by said rear wheel steering force determining means.

* * * * *

UNITED STATES PATENT AND TRADEMARK OFFICE
CERTIFICATE OF CORRECTION

PATENT NO.   : 4,939,653

DATED        : July 3, 1990

INVENTOR(S)  : Tsurumiya et al.

It is certified that error appears in the above-identified patent and that said Letters Patent is hereby corrected as shown below:

In the Abstract, line 6, before the period insert --and a rate of change of a front wheel steering angle--.
Column 1, line 34, after "According" insert --to--;
         line 36, after "motor" insert a comma.
Column 2, line 16, change "wheels.," to --wheels;--.
Column 4, line 63, change "18R" to --18RR--.
Column 6, line 39, delete "speed" (second occurrence);
         line 58, change "p8" to --P8--.
Column 9, line 51, change "A$\theta$T" to --$\theta$RT--.
Column 11, line 19, change "p7" to --P7--;
          line 25, change "ORT" to --$\theta$RT--;
          line 31, change "ORT" to --$\theta$RT--;
          line 32, change "18Rr" to -- 18RR--.

Signed and Sealed this

Twenty-fifth Day of February, 1992

Attest:

HARRY F. MANBECK, JR.

*Attesting Officer*     *Commissioner of Patents and Trademarks*